United States Patent
Saito et al.

(10) Patent No.: US 12,108,254 B2
(45) Date of Patent: Oct. 1, 2024

(54) DETERMINATION DEVICE, MOVING OBJECT, DETERMINATION METHOD, AND COMPUTER-READABLE STORAGE MEDIUM

(71) Applicant: HONDA MOTOR CO., LTD., Tokyo (JP)

(72) Inventors: Daisuke Saito, Tokyo (JP); Yuki Hirono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 362 days.

(21) Appl. No.: 17/589,908

(22) Filed: Feb. 1, 2022

(65) Prior Publication Data

US 2022/0286858 A1 Sep. 8, 2022

(30) Foreign Application Priority Data

Mar. 3, 2021 (JP) ................................. 2021-033975

(51) Int. Cl.
*H04L 9/40* (2022.01)
*H04L 12/40* (2006.01)
(Continued)

(52) U.S. Cl.
CPC ........... *H04W 12/121* (2021.01); *H04L 12/40* (2013.01); *H04W 4/48* (2018.02); *H04W 12/08* (2013.01);
(Continued)

(58) Field of Classification Search
CPC ..... H04W 12/121; H04W 4/48; H04W 12/08; H04L 12/40; H04L 2012/40215;
(Continued)

(56) References Cited

U.S. PATENT DOCUMENTS 11,621,967 B2 * 4/2023 Tsurumi .............. H04L 63/1425
726/22
2017/0180370 A1 * 6/2017 Satoh .................... G06F 21/565
(Continued)

FOREIGN PATENT DOCUMENTS

CN 108881267 A 11/2018
CN 111988342 A 11/2020
(Continued)

OTHER PUBLICATIONS

Office Action issued for counterpart Chinese Application 202210095291. 1, issued by The State Intellectual Property Office of People's Republic of China on Apr. 28, 2023.
(Continued)

*Primary Examiner* — Ali S Abyaneh

(57) ABSTRACT

A determination device includes: a signal determination unit configured to determine whether a signal flowing on a communication network in a moving object is abnormal; a transmission source determination unit configured to determine, when the signal determination unit determines that the signal flowing on the communication network is abnormal, whether a communication device which is a transmission source of the abnormal signal is normal; and an attack determination unit configured to determine that an attack on the communication network has occurred, when the signal determination unit determines that the signal flowing on the communication network is abnormal, and the transmission source determination unit determines that the communication device which is the transmission source of the abnormal signal is normal.

16 Claims, 14 Drawing Sheets

(51) Int. Cl.
*H04W 4/48* (2018.01)
*H04W 12/08* (2021.01)
*H04W 12/121* (2021.01)

(52) U.S. Cl.
CPC ............... *H04L 2012/40215* (2013.01); *H04L 2012/40273* (2013.01)

(58) Field of Classification Search
CPC ..... H04L 2012/40273; H04L 12/40013; H04L 63/1416; H04L 63/1425; H04L 63/1441; H04L 67/01; H04L 67/12
See application file for complete search history.

(56) References Cited

U.S. PATENT DOCUMENTS

| | | |
|---|---|---|
| 2018/0270337 A1 | 9/2018 | Kurauchi |
| 2020/0021611 A1 | 1/2020 | Maeda |
| 2020/0053112 A1 | 2/2020 | Torisaki |
| 2020/0233060 A1 | 7/2020 | Lull |
| 2021/0058372 A1* | 2/2021 | Katoh ................... B60W 50/04 |
| 2021/0273966 A1 | 9/2021 | Sasaki |
| 2021/0320932 A1 | 10/2021 | Tsurumi |
| 2022/0032966 A1* | 2/2022 | Senda ................. B60W 50/029 |

FOREIGN PATENT DOCUMENTS

| | | |
|---|---|---|
| JP | 2018157339 A | 10/2018 |
| JP | 2019176473 A | 10/2019 |
| JP | 2020092325 A | 6/2020 |
| JP | 2021034829 A | 3/2021 |
| WO | 2019142741 A1 | 7/2019 |
| WO | 2020137743 A1 | 7/2020 |
| WO | 2020203352 A1 | 10/2020 |

OTHER PUBLICATIONS

Office Action issued for counterpart Japanese Application No. 2021-033975, issued by the Japanese Patent Office on Jan. 4, 2023 (drafted on Dec. 22, 2022).

* cited by examiner

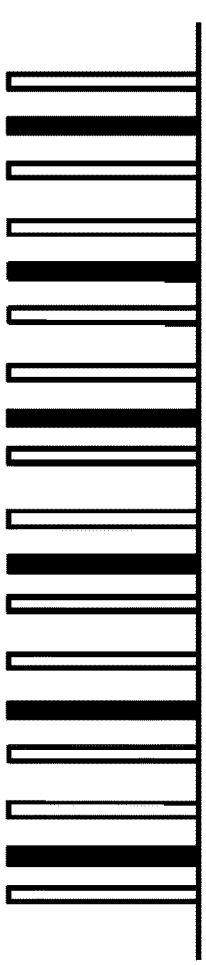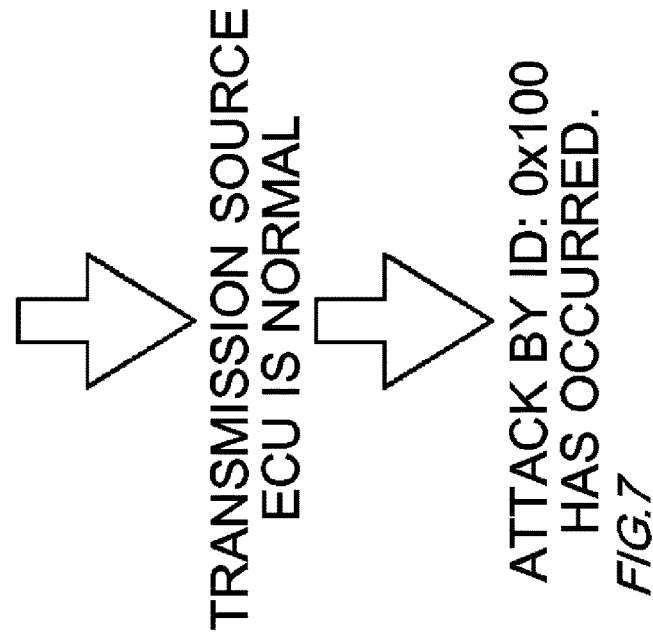
FIG.7

| ID | ALLOWABLE VALUE | RATE OF CHANGE |
|---|---|---|
| 0x101 | [0,1] | - |
| 0x102 | [0-180km/h] | 80km/h |

FIG.12

AT TIME OF BEING NORMAL
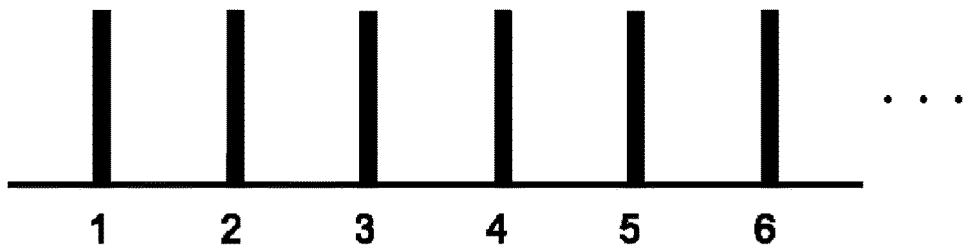
AT TIME OF ATTACK
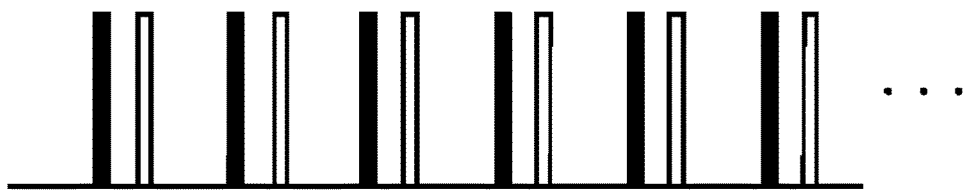
AT TIME OF FAILURE
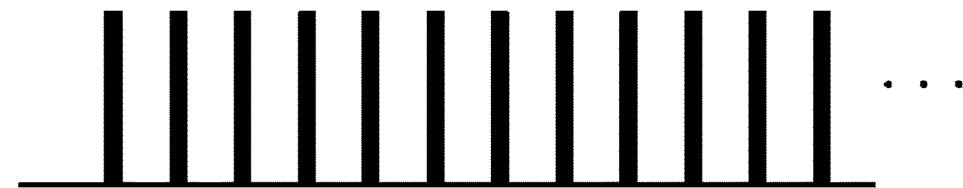
FIG.13

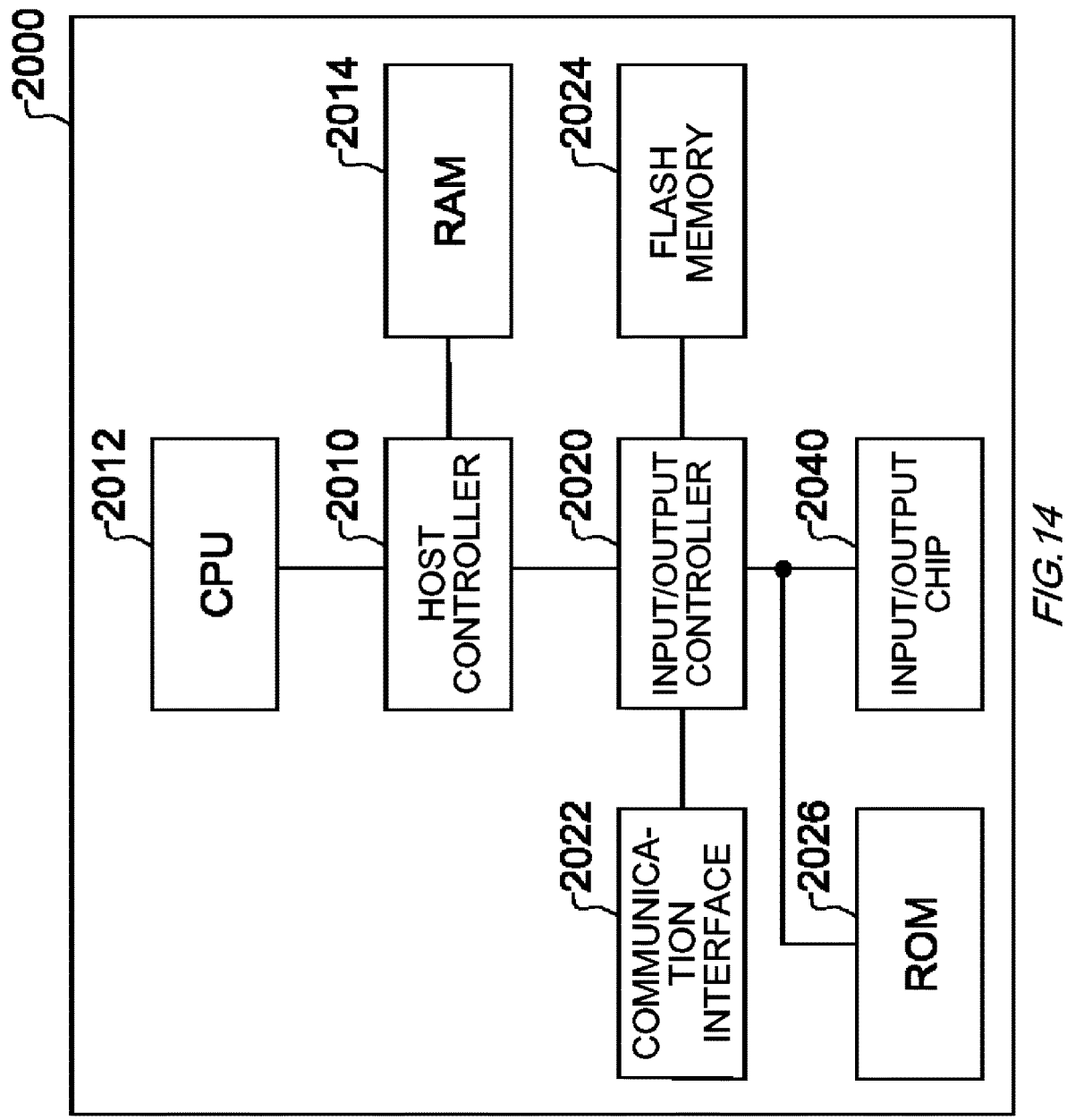

DETERMINATION DEVICE, MOVING OBJECT, DETERMINATION METHOD, AND COMPUTER-READABLE STORAGE MEDIUM

The contents of the following Japanese patent application(s) are incorporated herein by reference:
NO. 2021-033975 filed on Mar. 3, 2021.

BACKGROUND

1. Technical Field

The present invention relates to a determination device, a moving object, a determination method, and a computer-readable storage medium.

2. Related Art

Patent Document 1 discloses that an attack is detected by comparing, with a specified value, the number of data signals input to the in-vehicle communication network per unit time.
[Patent Document 1] Japanese Patent Application Publication No. 2020-092325

BRIEF DESCRIPTION OF THE DRAWINGS

FIG. 7 is a diagram for describing a method in which a transmission source determination unit 220 specifies a state of a transmission source ECU.

FIG. 12 shows a data structure of reference data which is used by the individual signal determination unit 230 to determine the normality and abnormality for each signal.

FIG. 13 is a diagram for describing a method for the individual signal determination unit 230 to determine the normality and abnormality of the signal by using an alive counter.

FIG. 14 shows an example of a computer 2000 in which a plurality of embodiments of the present invention may be entirely or partially embodied.

DESCRIPTION OF EXEMPLARY EMBODIMENTS

Hereinafter, the invention will be described through embodiments of the invention, but the following embodiments do not limit the invention according to claims. Further, not all of the combinations of features described in the embodiments are essential for means to solve the problem in the invention.

Figure 1:
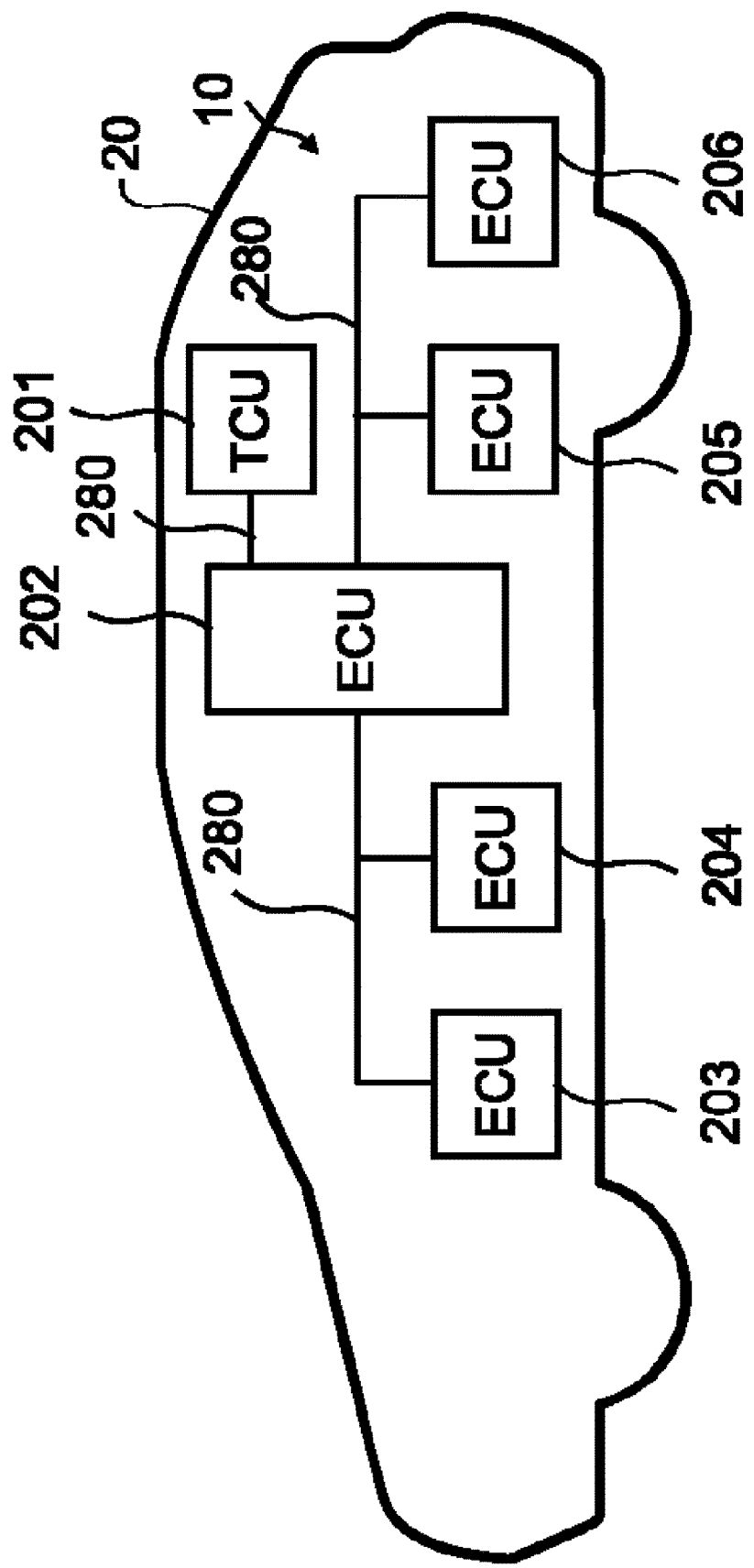
FIG. 1 schematically shows a vehicle 20 according to an embodiment.

FIG. 1 schematically shows a vehicle 20 according to an embodiment. The vehicle 20 includes a control system 10 including an ECU 202, an ECU 203, an ECU 204, an ECU 205, an ECU 206, and a TCU 201. A system configuration, in which the control system 10 includes the TCU 201, the ECU 202, the ECU 203, the ECU 204, the ECU 205, and the ECU 206, is illustrated; however, the system configuration of the control system 10 is not limited to the example of the present embodiment.

The ECU 202, the ECU 203, the ECU 204, the ECU 205, and the ECU 206 are ECUs (Electronic Control Units) that control the vehicle 20. For example, the ECU 202, the ECU 203, the ECU 204, the ECU 205, and the ECU 206 control various devices such as an engine, a motor, a transmission, a steering device, a fuel injection device, an air conditioner, and a navigation device. The TCU 201 is a telematics control unit (Telematics Control Unit). The TCU 201 is responsible for a mobile communication. The TCU 201 transmits and receives data to and from an external server based on a control of the ECU 202.

The ECU 202, the ECU 203, the ECU 204, the ECU 205, and the ECU 206 are connected to each other to be able to communicate with each other by a communication network 280. In the present embodiment, the communication network 280 is assumed to include at least a CAN (Controller Area Network). The communication network 280 may be configured to include a network or the like based on IEEE 802.3 series. The TCU (telematics control unit) 201 that wirelessly communicates with an outside is connected to the ECU 202 via the communication network 280. The ECU 202 controls the TCU 201, the ECU 203, the ECU 204, the ECU 205, and the ECU 206 in an integrated manner. The ECU 202 functions as a gateway and has a function of relaying a communication between the communication network 280 and the outside of the vehicle, and a communication between the ECU 203, the ECU 204, the ECU 205, and the ECU 206.

In the present embodiment, the ECU 202 determines whether an attack on the communication network 280 has occurred. For example, the ECU 202 determines whether an abnormal signal is flowing on the communication network 280. When determining that the abnormal signal is flowing on the communication network 280, the ECU 202 determines whether an ECU which is a transmission source of the abnormal signal is normal. When the ECU which is the transmission source of the abnormal signal is normal, it is determined that the attack on the communication network 280 has occurred, and log information for analyzing the abnormal signal is collected, and is transmitted to the external server through the TCU 201. On the other hand, when the ECU which is the transmission source of the abnormal signal is not normal, it is determined that the ECU which is the transmission source of the abnormal signal is under failure, and it is determined that no attack has occurred on the communication network 280. In this case, the ECU 202 does not collect the log information, and does not transmit the log information to the external server. Thereby, when the ECU under failure transmits the abnormal signal to the communication network 280, it is possible to reduce a possibility of erroneously determining that the attack is occurring, from the signal. Therefore, it is possible to reduce a storage resource required to store the log information. In addition, it is possible to reduce communication traffic for transmitting the log information to the outside of the vehicle 20.

Figure 2:
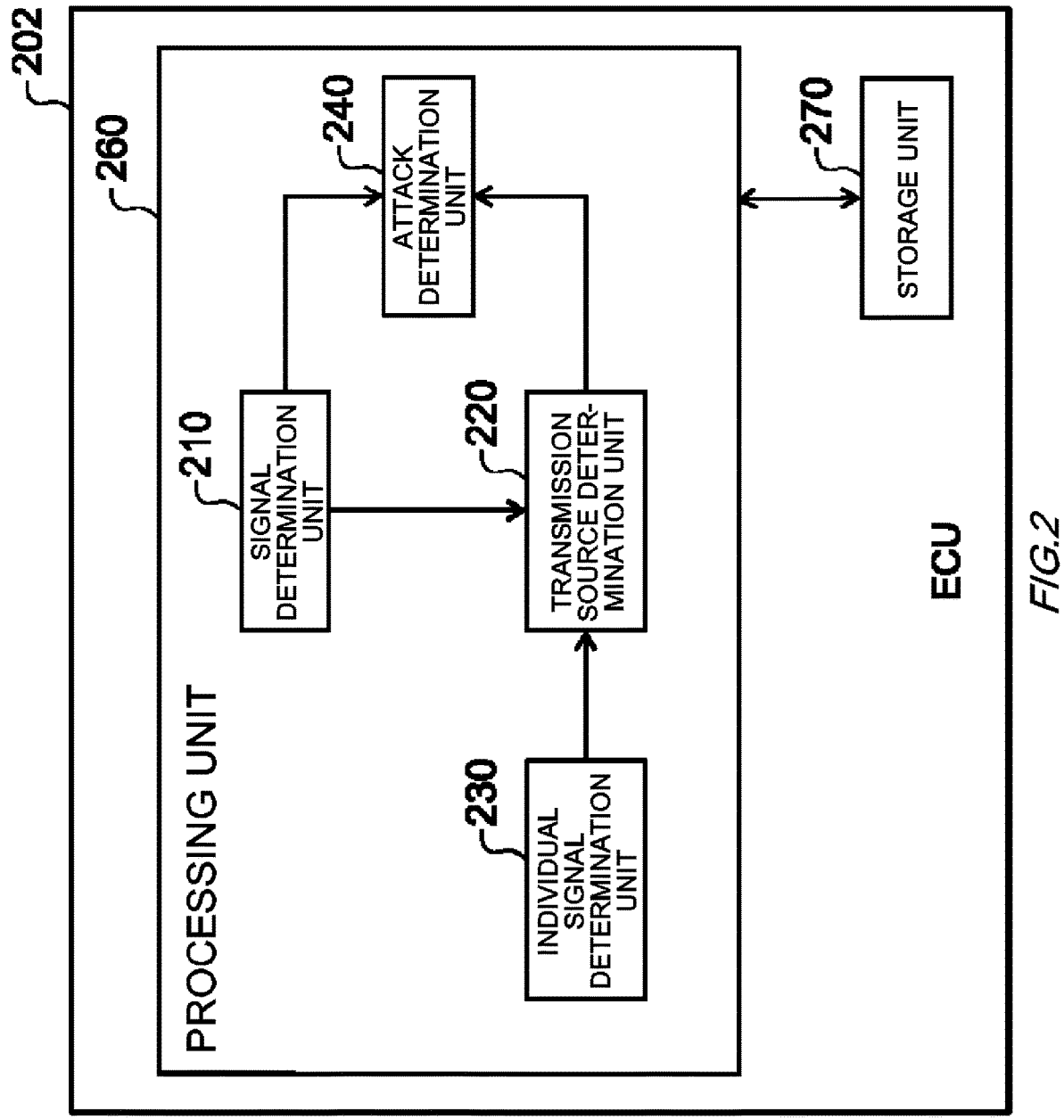
FIG. 2 schematically shows a functional configuration of an ECU 202.

FIG. 2 schematically shows a functional configuration of an ECU 202. The ECU 202 includes a processing unit 260 and a storage unit 270. The processing unit 260 may be implemented by a processor such as a CPU that performs calculation processing. The storage unit 270 may be realized by a non-volatile storage medium such as a flash memory or a volatile storage medium such as a random access memory. The ECU 202 may be configured to include a computer. The ECU 202 executes various controls based on output values from various sensors according to a program stored in the non-volatile storage medium. It should be noted that FIG. 2 shows a functional configuration for the ECU 202 to function as a determination device. The ECU 202 may have a functional configuration other than the functional configuration shown in FIG. 2.

The processing unit 260 includes a signal determination unit 210, a transmission source determination unit 220, an individual signal determination unit 230, and an attack determination unit 240. The signal determination unit 210 acquires a signal flowing on the communication network 280 in the vehicle 20. The signal determination unit 210 determines whether the signal flowing on the communication network 280 is abnormal. When the signal determination unit 210 determines that the signal flowing on the communication network 280 is abnormal, the transmission source determination unit 220 determines whether the ECU which is the transmission source of the abnormal signal is normal. The attack determination unit 240 determines that the attack on the communication network 280 has occurred, when the signal determination unit 210 determines that the signal flowing on the communication network 280 is abnormal, and the transmission source determination unit 220 determines that the ECU which is the transmission source of the abnormal signal is normal.

When the attack determination unit 240 determines that the attack has occurred on the communication network 280, information relating to the abnormal signal is transmitted to an external device. The signal determination unit 210 may determine whether the signal flowing on the communication network 280 is abnormal for each type of signal. In a case where the signal determination unit 210 determines that a first type of signal flowing on the communication network 280 is abnormal, when the signal determination unit 210 determines that a second type of signal which is transmitted to the communication network 280 from an ECU which is a transmission source of the first type of signal is not abnormal, the transmission source determination unit 220 may perform a determination that the ECU which is the transmission source is normal.

The individual signal determination unit 210 may determine whether each of signals flowing on the communication network 280 is abnormal for each signal. In a case where the signal determination unit 210 determines that the signal flowing on the communication network 280 is abnormal, when a signal determined by the individual signal determination unit 210 not to be abnormal is included in a second signal transmitted, after a first signal, to the communication network 280 from an ECU which is a transmission source of the first signal determined by the individual signal determination unit 210 to be abnormal, the transmission source determination unit 220 determines that the ECU which is the transmission source is normal, and when a signal determined by the individual signal determination unit 210 not to be abnormal is not included in the second signal transmitted, after the first signal, to the communication network 280 from the ECU which is the transmission source of the first signal determined by the individual signal determination unit 210 to be abnormal, the transmission source determination unit 220 determines that the ECU which is the transmission source is abnormal.

The individual signal determination unit 230 learns a transmission pattern of the signal flowing on the communication network 280 for each type of signal flowing on the communication network 280, and when a signal which is transmitted to the communication network 280 in a transmission pattern different from the learned transmission pattern is detected, the individual signal determination unit 230 determines that the detected signal is abnormal.

The individual signal determination unit 210 extracts a payload value of the signal flowing on the communication network 280, and determines that a signal from which a payload value different from a predetermined value is extracted is abnormal. The individual signal determination unit 210 extracts the payload value of the signal flowing on the communication network 280, and determines that a signal whose amount of a temporal change in the extracted payload value does not satisfy a predetermined condition is abnormal. The vehicle 20 is a vehicle, the ECU is an ECU (Electronic Control Unit), the communication network 280 is a CAN (Controller Area Network), and the individual signal determination unit 210 and the transmission source determination unit 220 determine whether each of the signals flowing on the communication network 280 is abnormal for each signal, based on a change in a value of an alive counter of a frame which is transmitted from the ECU connected to the CAN, and determine whether an ECU which transmits the signal determined to be abnormal is normal.

Figure 3:
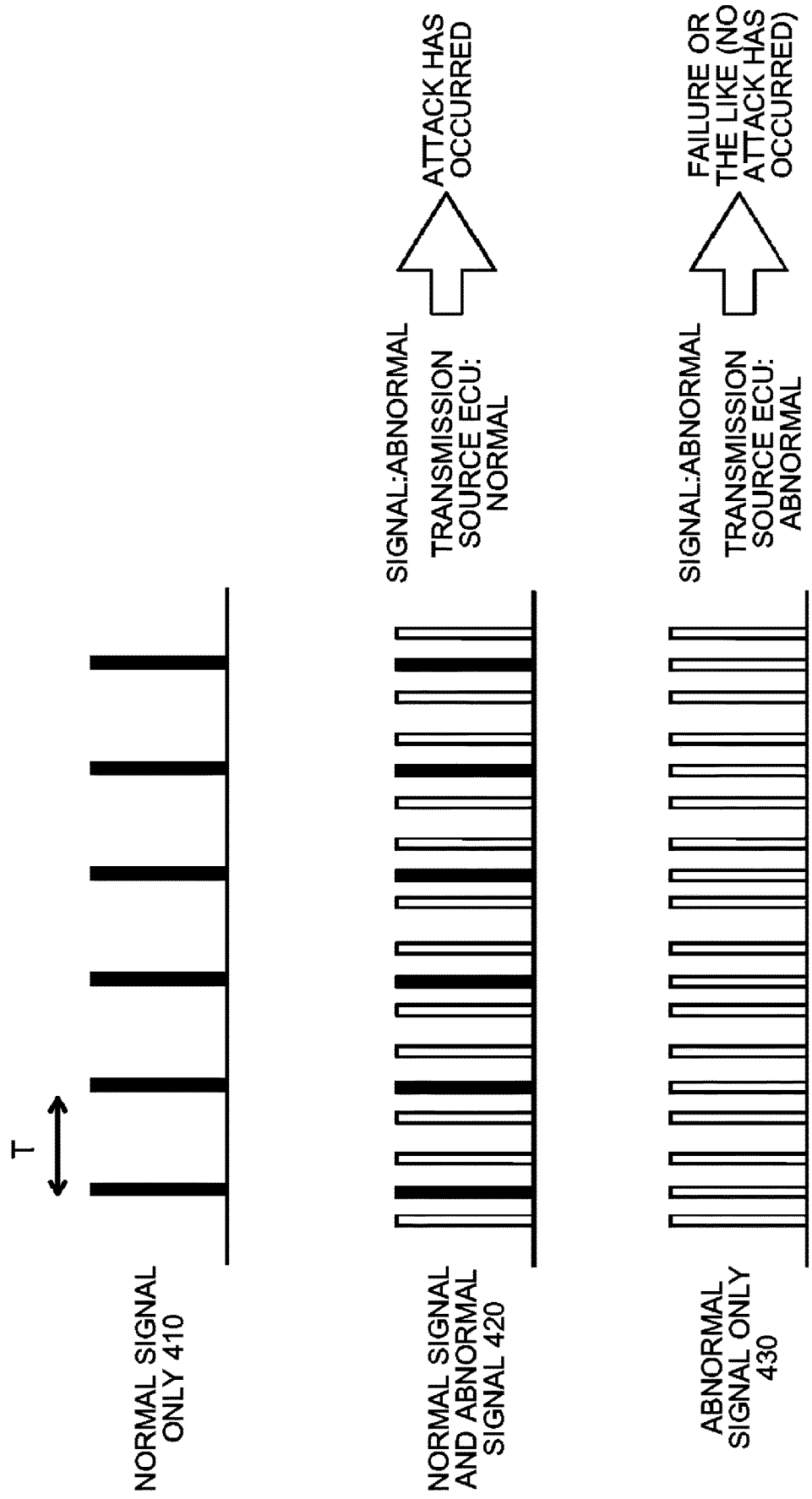
FIG. 3 is a schematic diagram for describing an outline of determination processing executed by the ECU 202.

FIG. 3 is a schematic diagram for describing an outline of determination processing executed by the ECU 202. The ECU 202, the ECU 203, the ECU 204, the ECU 205, and the ECU 206 respectively execute calculations, and transmit signals including calculation results to the communication network 280. This makes the ECU 202, the ECU 203, the ECU 204, the ECU 205, and the ECU 206 execute a coordinated control. As shown in "Normal signal only 410" in FIG. 3, the signal which is transmitted and received for each ECU to perform the coordinated control is transmitted to the communication network 280 at a constant cycle T (for example, 10 ms).

A normal signal and an abnormal signal 420 in FIG. 3 show a case where a third party attacks the communication network 280 by transmitting an unauthorized signal to the communication network 280. It should be noted that in the present embodiment, the normal signal is shown in black and the abnormal signal is shown in white. In this case, a time interval of the signal flowing on the communication network 280 is shorter than that of the regular cycle T. Therefore, the signal determination unit 210 determines that the signal flowing on the communication network 280 is abnormal. It should be noted that the "abnormal signal" may be the unauthorized signal transmitted to the communication network 280 by the third party, or may be the signal transmitted to the communication network 280 by the ECU under failure.

When it is determined that the signal flowing on the communication network 280 is abnormal, the transmission source determination unit 220 identifies the ECU which is the transmission source of the signal determined to be abnormal. For example, the transmission source determination unit 220 identifies an ECU which is decided to transmit a type of signal determined to be abnormal, among the ECU 203, the ECU 204, the ECU 205, and the ECU 206. It should be noted that in the present embodiment, the ECU which is decided to transmit the type of signal determined to be abnormal is referred to as a "transmission source ECU". The type of signal is identified by, for example, an ID which is set for a CAN frame. It should be noted that the transmission source ECU is the ECU which is the transmission source of the signal determined to be abnormal. The ID may be spoofed when the communication network 280 is attacked from the outside, and thus the "ECU which is the transmission source of the signal determined to be abnormal" does not refer to a transmission source of a signal transmitted to the communication network 280 by the attack, but refers to an ECU which is decided to transmit the same type of signal as the signal.

The transmission source determination unit 220 determines whether a state of the identified transmission source ECU is normal. For example, the transmission source determination unit 220 determines whether the state of the transmission source ECU is a state of failure. A method for determining whether the state of the ECU is normal will be described below. In a case where the signal flowing on the communication network 280 is abnormal, when the state of the transmission source ECU is normal, the attack determination unit 240 determines that the attack on the communication network 280 has occurred.

On the other hand, as shown in "Abnormal signal only 430" in FIG. 3, when the ECU is under failure, the signal may be transmitted to the communication network 280 at a short interval. In this case, when the transmission source determination unit 220 determines that the state of the transmission source ECU is abnormal, the attack determination unit 240 determines that the transmission source ECU is under failure, and causes an ECU, which performs a failure analysis of the vehicle 20, to execute a control of the failure analysis.

Figure 4:
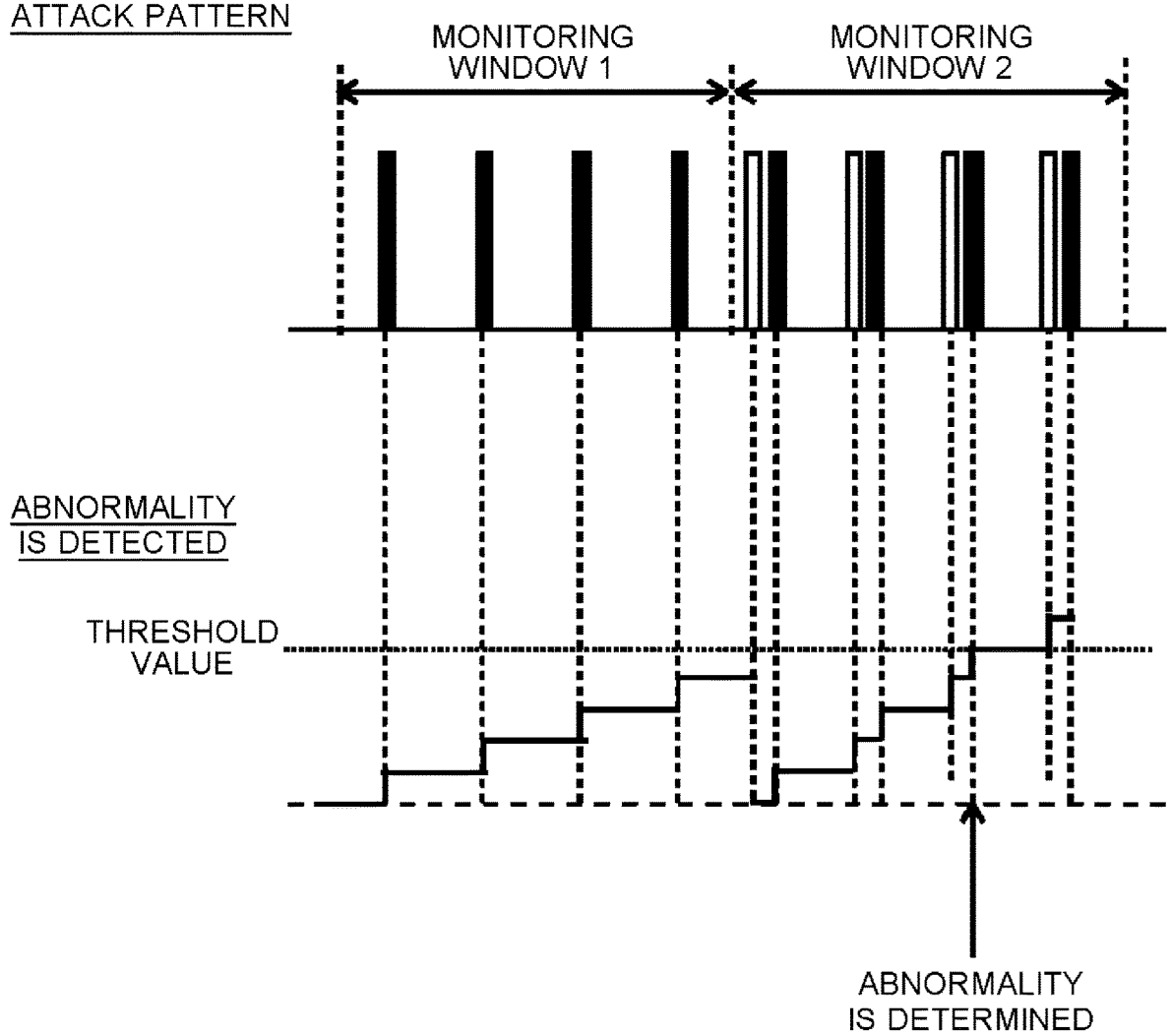
FIG. 4 is an example of a method for determining whether a signal flowing on a communication network 280 is abnormal.

FIG. 4 is an example of a method for determining whether a signal flowing on a communication network 280 is abnormal. A "normal pattern" in FIG. 4 is a pattern of a signal which is transmitted in the regular cycle T. An "attack pattern" in FIG. 4 is, for example, a pattern in which the third party transmits, to the communication network 280, the unauthorized signal for pretending to be a regular signal. The signal determination unit 210 counts the number of signals which are transmitted to the communication network 280 within a predetermined monitoring window (a period). When the number of counted signals exceeds a predetermined threshold value, the signal determination unit 210 determines that the signal flowing on the communication network 280 is abnormal. In the example of FIG. 4, the signal determination unit 210 determines that the signal flowing on the communication network 280 is abnormal in a monitoring window 2.

Figure 5:
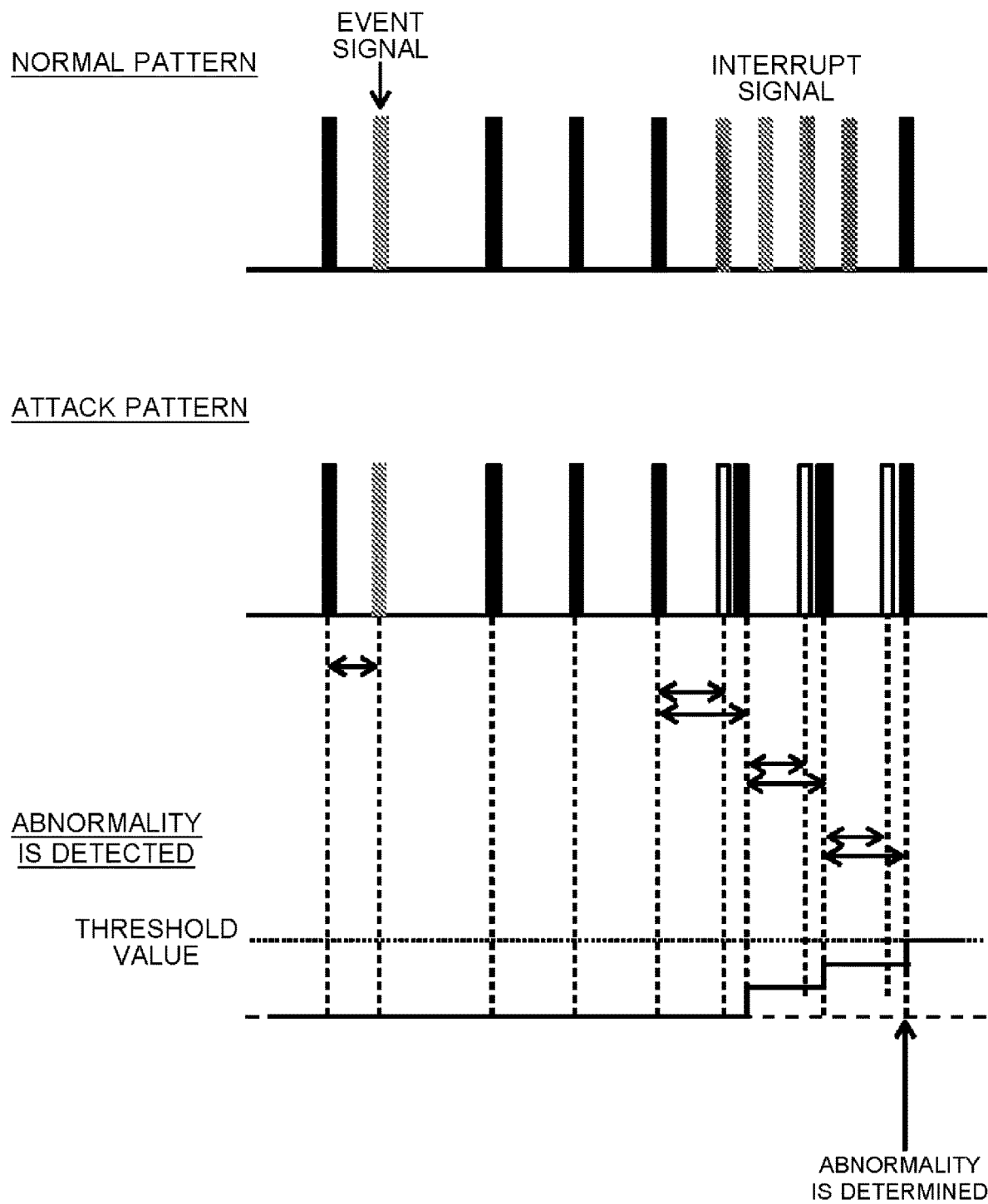
FIG. 5 is another example of the method for determining whether the signal flowing on the communication network 280 is abnormal.

FIG. 5 is another example of the method for determining whether the signal flowing on the communication network 280 is abnormal. A "normal pattern" in FIG. 5 is a pattern in which an event signal or an interrupt signal is transmitted, along with a regular signal which is transmitted at some transmission timing among transmission timings of the regular cycle T. An "attack pattern" in FIG. 5 is, for example, a pattern in which the third party transmits, to the communication network 280, the unauthorized signal for pretending to be the regular signal. The signal determination unit 210 counts the number of signals which are continuously transmitted within a specified cycle based on a timing at which a certain signal is transmitted. When the number of counted signals exceeds a predetermined threshold value, the signal determination unit 210 determines that the signal flowing on the communication network 280 is abnormal. In the example of FIG. 5, when the number of signals which are continuously transmitted within the specified cycle reaches three, the signal determination unit 210 determines that the signal which flowed on the communication network 280 was abnormal.

Figure 6:
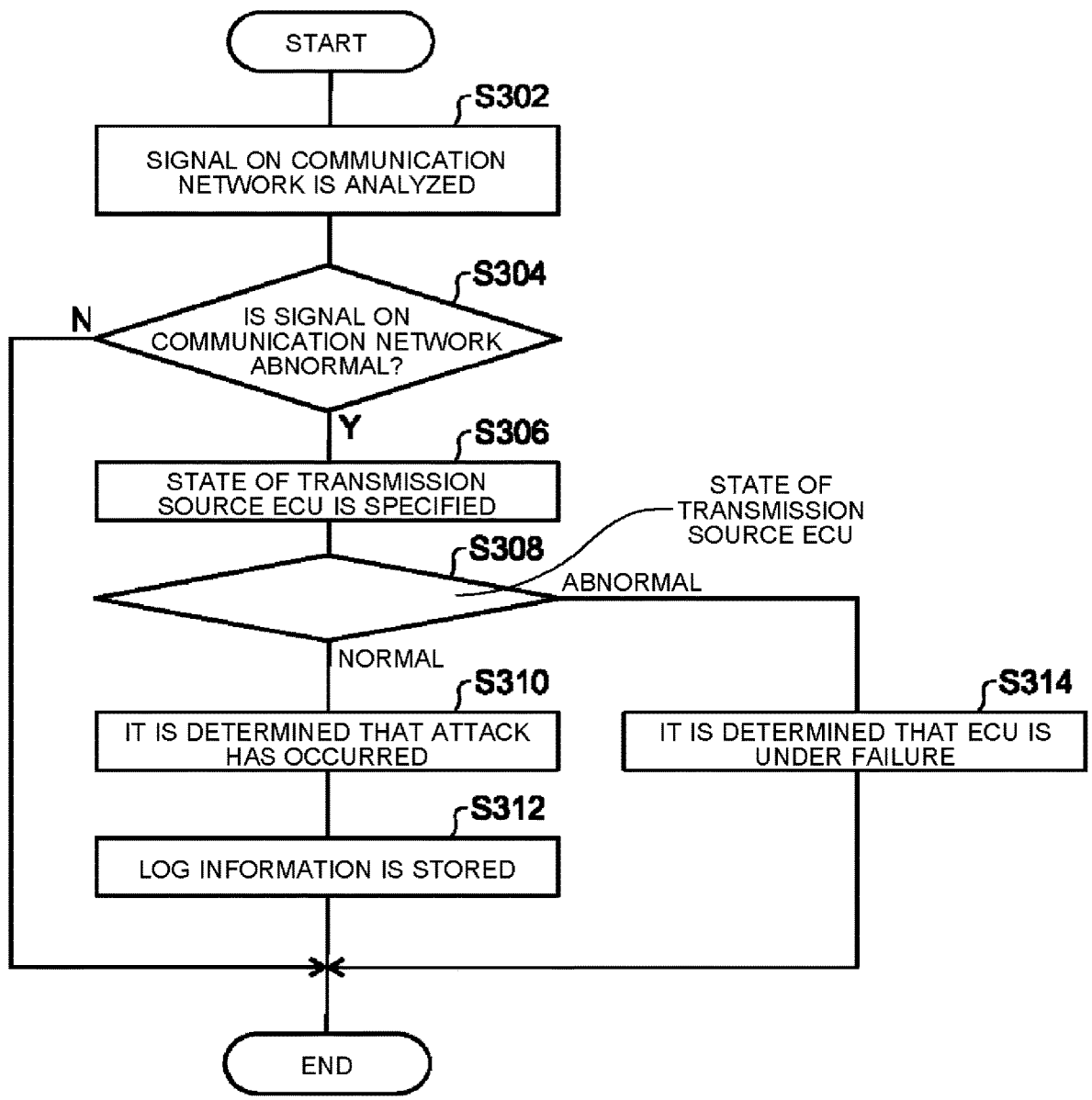
FIG. 6 is a flowchart showing a procedure executed by the ECU 202.

FIG. 6 is a flowchart showing a procedure executed by the ECU 202. The signal determination unit 210 analyzes the signal flowing on the communication network 280 and detects an abnormality. For example, the signal determination unit 210 counts the number of signals in the monitoring window, as described with reference to FIG. 4 and FIG. 5. In addition, the number of signals, which are continuously transmitted within a specified cycle, are counted based on a transmission timing of the signal. In S304, the signal determination unit 210 determines whether the signal flowing on the communication network 280 is abnormal. For example, as described with reference to FIG. 4 and FIG. 5, it is determined whether the number of counted signals exceeds a predetermined threshold value. If it is determined that the signal flowing on the communication network 280 is not abnormal in S304, processing of this flowchart ends.

If the signal determination unit 210 determines that the signal flowing on the communication network 280 is abnormal in S304, the transmission source determination unit 220 specifies the state of the transmission source ECU in S306, and determines whether the state of the transmission source ECU is normal or abnormal in S308. A method for specifying the state of the transmission source ECU will be described below. If it is determined that the state of the transmission source ECU is normal in S308, it is determined that the attack on the communication network 280 has occurred (S310). Subsequently, the log information relating to the signal determined to be abnormal in S304 is collected, and is stored in the storage unit 270 in S312, and the processing of this flowchart ends. For example, the log information is information required to analyze the attack on the communication network 280, such as the signal determined to be abnormal and the transmission timing of the signal determined to be abnormal. The log information stored in the storage unit 270 is transmitted to an external log collection server through the TCU 201.

If it is determined that the state of the transmission source ECU is abnormal in S308, the attack determination unit 240 determines that the abnormal signal has been transmitted due to the failure of the ECU in S314. Here, the attack determination unit 240 may determine that the ECU is under failure, that is, there is no attack, or may confirm the failure of the ECU, and then continue to check a possibility of the attack, that is, reserve the attack determination. It should be noted that the ECU 202 may repeatedly execute the processing of this flowchart. The ECU 202 may execute the processing of this flowchart at a predetermined time interval. The ECU 202 may constantly execute the processing of this flowchart.

FIG. 7 is a diagram for describing a method in which a transmission source determination unit 220 specifies a state of a transmission source ECU. FIG. 7 shows how a frame for which ID 0x100 is set, and a frame for which 0x200 is set as the ID are transmitted. It should be noted that the ID represents a type of signal. For example, the ID indicates a type of data carried by the signal. For example, when transmitting a signal including vehicle speed data detected by a vehicle speed sensor, an ECU that acquires information from the vehicle speed sensor assigns a specific ID, which is associated with the vehicle speed, to the signal and transmits the signal to the communication network 280. Therefore, which ECU assigns which ID to transmit the signal is decided, among the ECU 203, the ECU 204, the ECU 205, and the ECU 206.

As shown in FIG. 7, the signal for which ID 0x100 is set is transmitted at a time interval shorter than the cycle T. Therefore, the signal determination unit 210 determines that a signal group for which the ID 0x100 is set is abnormal. On the other hand, the signal for which ID 0x200 is set is transmitted in the cycle T. Therefore, the signal determination unit 210 determines that a signal group for which the ID 0x200 is set is not abnormal.

When the signal determination unit 210 determines that the signal for which 0x100 is set as the ID is abnormal, the transmission source determination unit 220 identifies the ECU which is decided to set 0x100 as the ID and transmit the signal, among the ECU 203, the ECU 204, the ECU 205, and the ECU 206. Here, it is assumed that the ECU, which sets 0x100 for the ID and performs the transmission, is decided to transmit also the signal to which 0x200 is assigned. As shown in FIG. 7, the signal for which 0x200 is set as the ID is determined by the signal determination unit 210 to be normal. Therefore, the transmission source determination unit 220 determines that the state of the transmission source ECU which sets 0x100 for the ID is normal (not under failure). Therefore, the attack determination unit 240 determines that the attack by using the signal for which the ID 0x100 is set has occurred.

Figure 8:
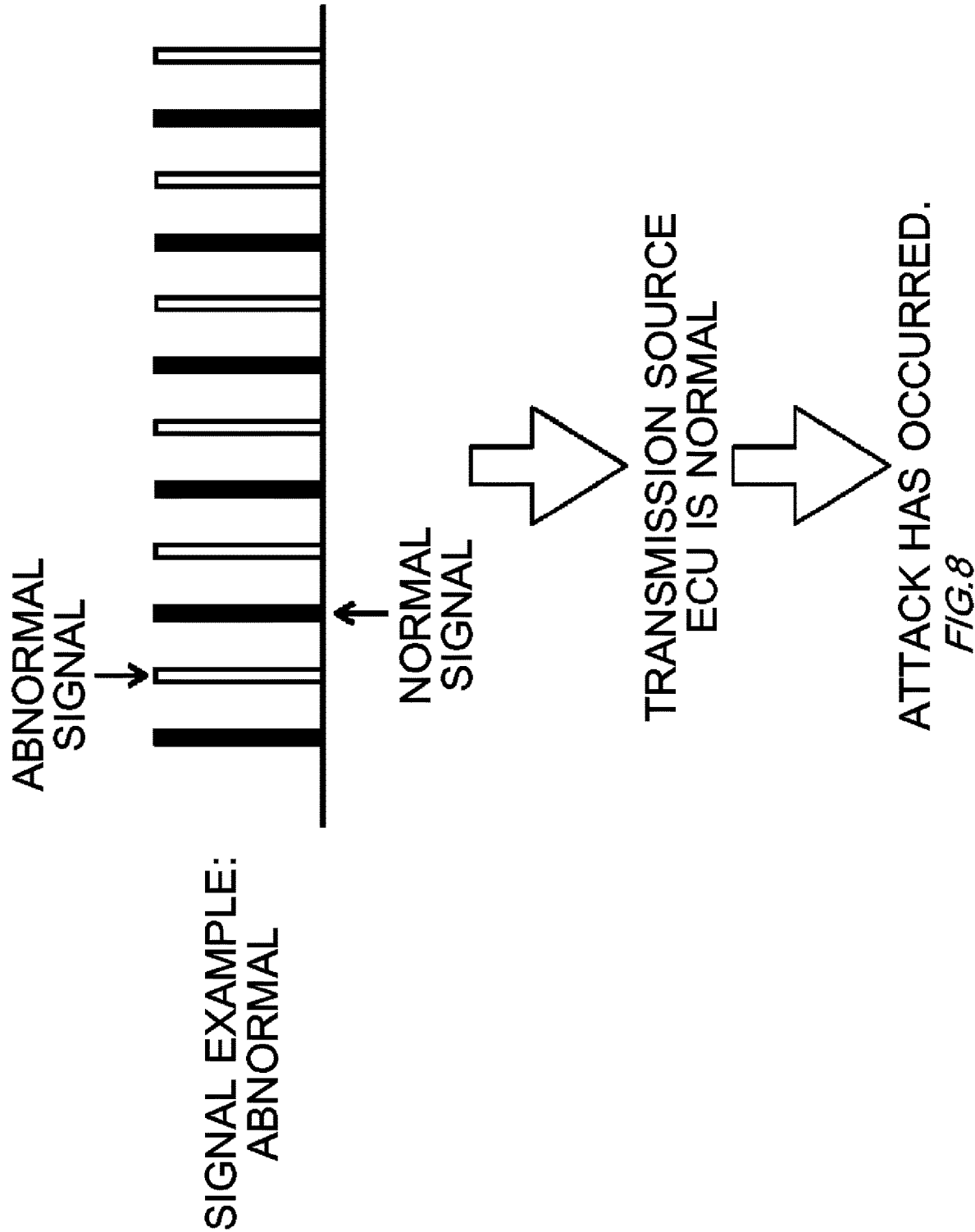
FIG. 8 is a diagram for describing another method in which the transmission source determination unit 220 specifies the state of the transmission source ECU.

FIG. 8 is a diagram for describing another method in which the transmission source determination unit 220 specifies the state of the transmission source ECU. The signal shown in FIG. 8 is assumed to be the signal transmitted by the same ECU. The transmission source determination unit 220 specifies the state of the transmission source ECU based on a determination result of normality and abnormality for each signal by the individual signal determination unit 230. It should be noted that the method in which the individual signal determination unit 230 determines the normality and abnormality for each signal will be described below.

As shown in FIG. 8, the signal, which is transmitted subsequent to the signal determined by the individual signal determination unit 230 to be abnormal, is determined to be normal. Therefore, the transmission source determination unit 220 determines that the state of the transmission source ECU is normal. As a result, the attack determination unit 240 determines that the attack on the communication network 280 has occurred.

Figure 9:
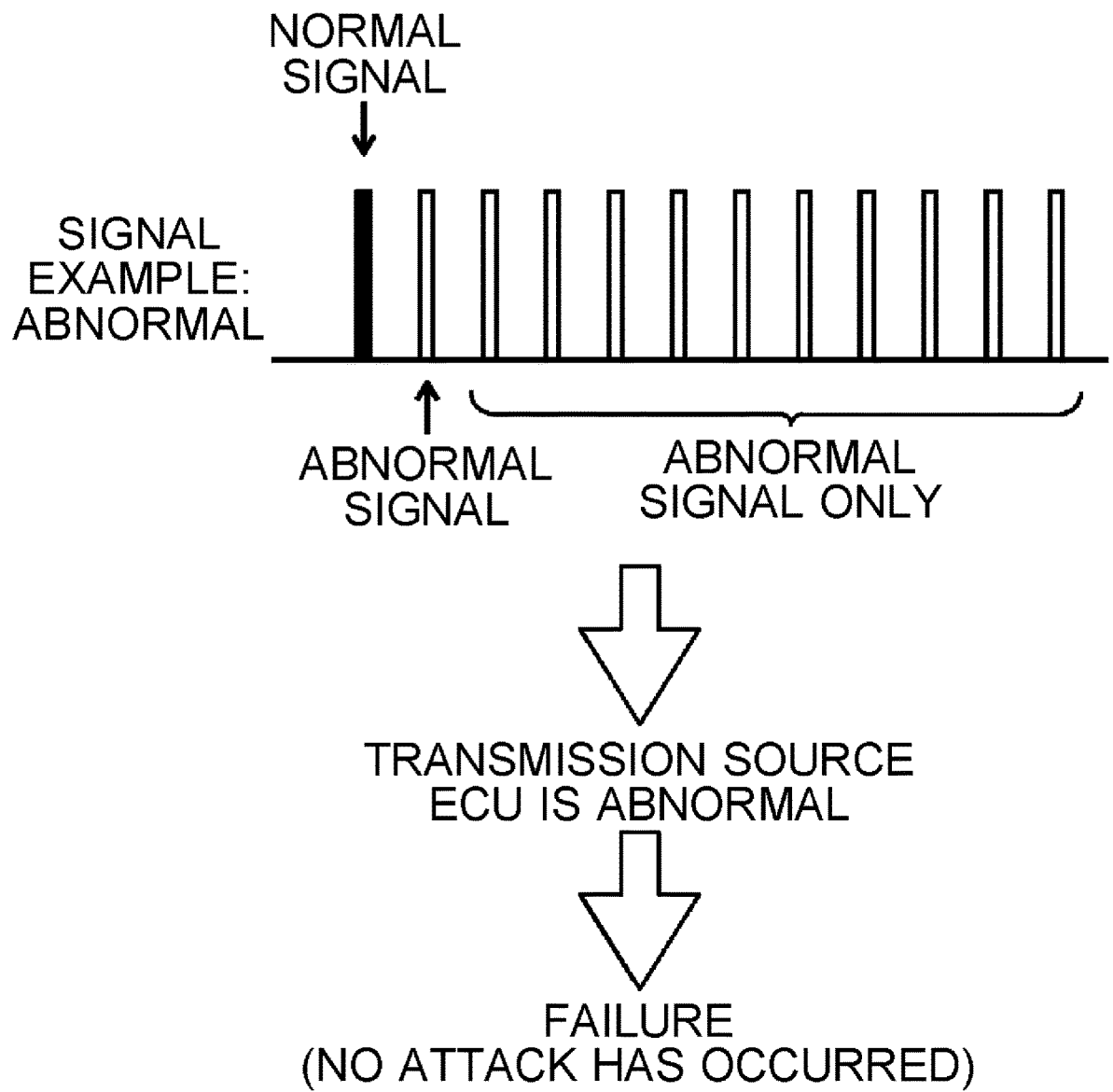
FIG. 9 is a diagram for describing another method in which the transmission source determination unit 220 specifies the state of the transmission source ECU.

FIG. 9 is a diagram for describing another method in which the transmission source determination unit 220 specifies the state of the transmission source ECU. The signal shown in FIG. 9 is assumed to be the signal transmitted by the same ECU. As shown in FIG. 9, all the signals, which are transmitted after the signal determined by the individual signal determination unit 230 to be abnormal, are determined to be abnormal. Therefore, the transmission source determination unit 220 determines that the state of the transmission source ECU is abnormal.

Figure 10:
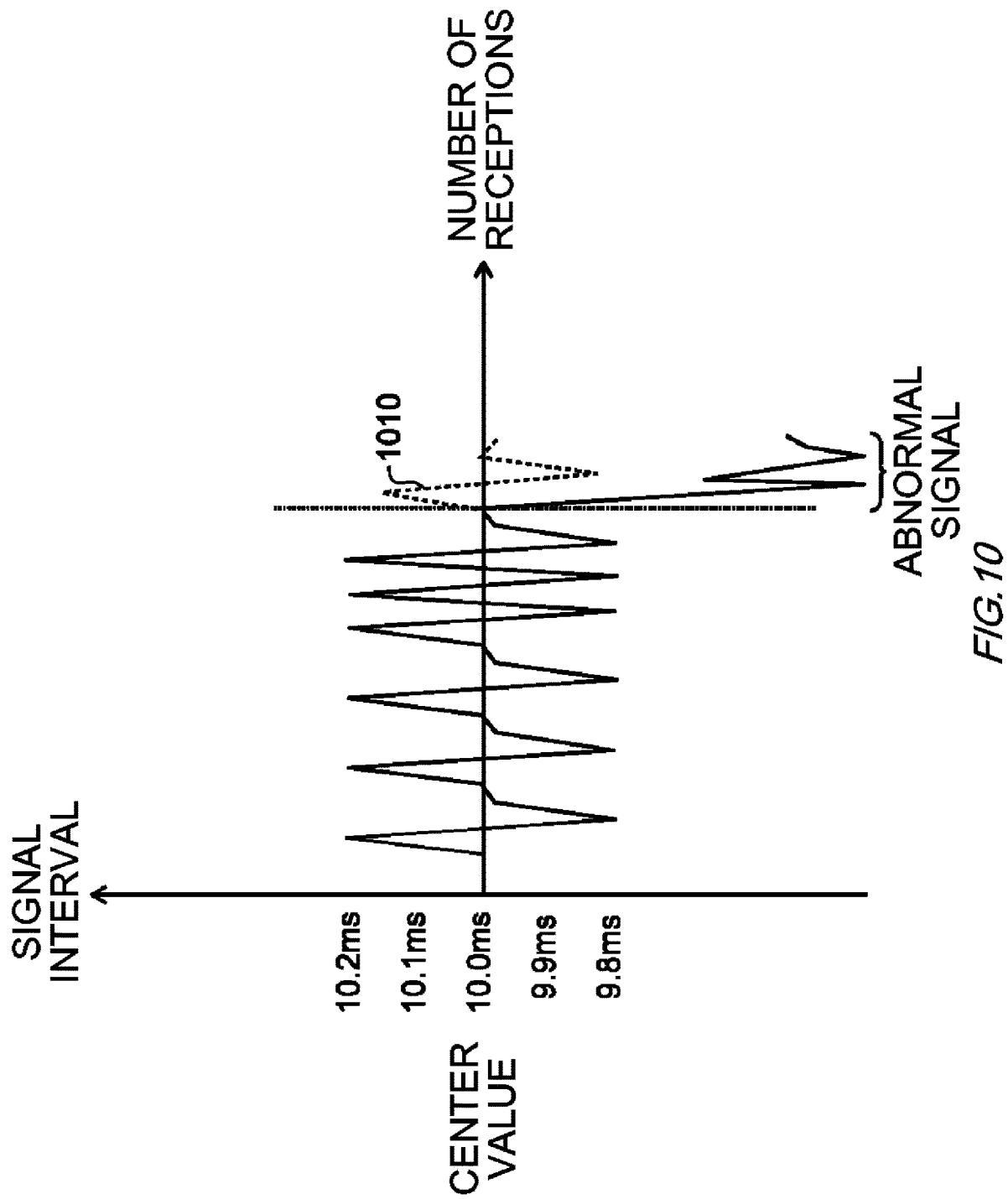
FIG. 10 shows a case where a pattern 1010 which has been predicted, and a pattern of a signal interval of a signal which has been actually received do not match by a matching degree higher than or equal to a predetermined value.
Figure 11:
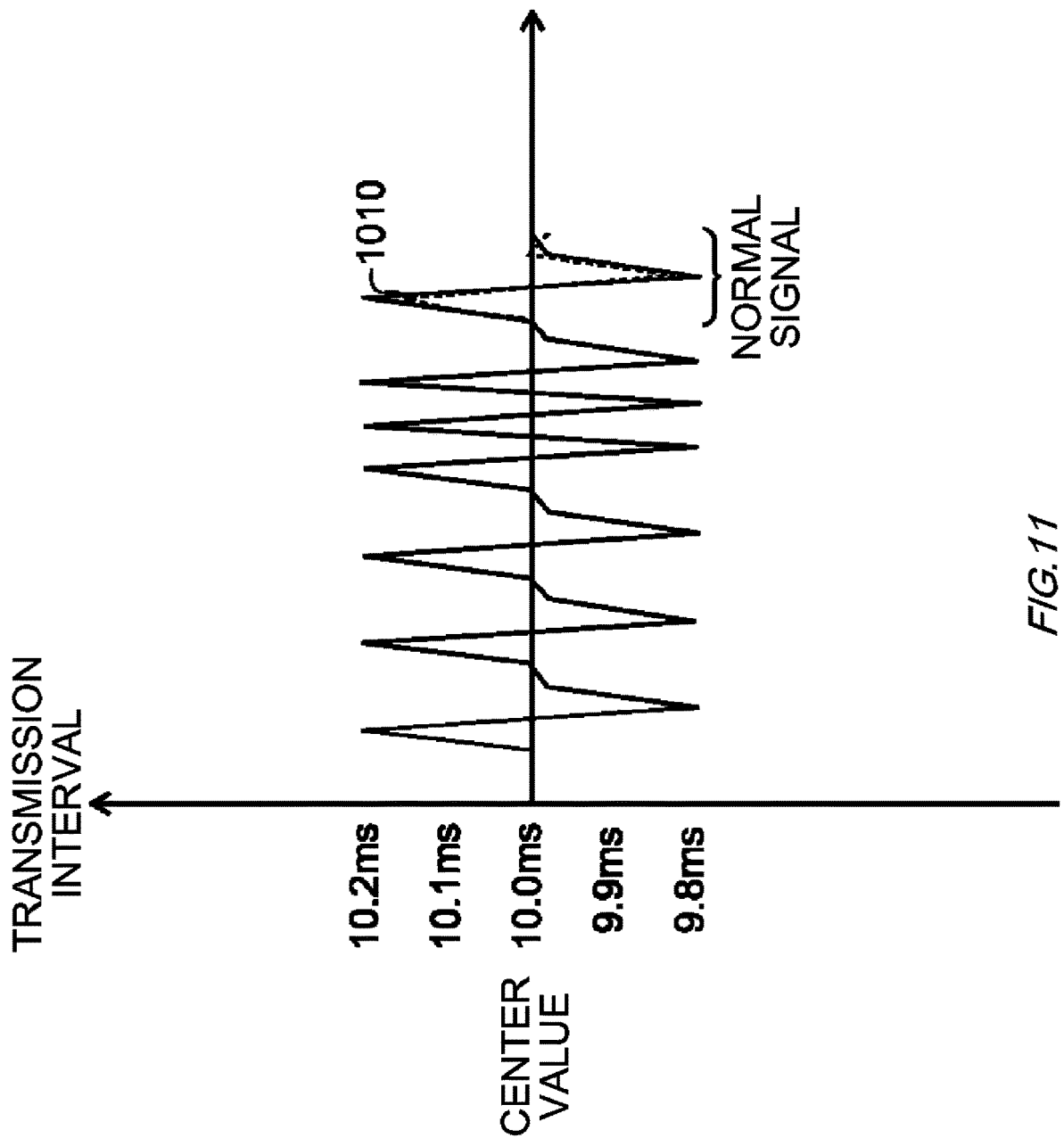
FIG. 11 is a diagram for describing a method in which an individual signal determination unit 230 determines normality and abnormality for each signal.

Each of FIG. 10 and FIG. 11 is a diagram for describing a method in which an individual signal determination unit 230 determines normality and abnormality for each signal. In each of graphs of FIG. 10 and FIG. 11, the horizontal axis represents the number which is counted up each time the signal is received, and the vertical axis represents a signal interval. In each of the graphs of FIG. 10 and FIG. 11, the signal interval is plotted each time the signal with the same ID is received. The signal interval is an elapsed time from an immediately previous timing when the signal was received.

As an example shown in FIG. 10, it can be seen that when the signal interval is plotted with respect to the number of receptions, a specific pattern may be made for the receptions. The individual signal determination unit 230 collects the signal interval of the signal on the communication network 280 for each ID in chronological order, learns a transmission interval pattern for each ID, and generates a trained model for each ID by machine learning. Then, the individual signal determination unit 230 collects a reception interval of the signal flowing through the communication network 280 for each ID, uses reception interval data collected for each ID and the trained model generated for each ID, and predict a pattern 1010 of the signal interval of the subsequent signal. The individual signal determination unit 230 compares the predicted pattern 1010 with that of the signal interval of the actually received signal. FIG. 10 shows a case where a pattern 1010 which has been predicted, and a pattern of a signal interval of a signal which has been actually received do not match by a matching degree higher than or equal to a predetermined value, and FIG. 11 shows a case where the pattern 1010 which has been predicted, and the pattern of the signal interval of the signal which has been actually received match by a matching degree higher than or equal to a predetermined value.

As shown in FIG. 11, when the predicted pattern 1010 and the pattern of the signal interval of the actually received signal match by a matching degree higher than or equal to a predetermined value, the individual signal determination unit 230 determines that the actually received signal is normal. As shown in FIG. 10, when the predicted pattern 1010 and the pattern of the signal interval of the actually received signal do not match by a matching degree higher than or equal to a predetermined value, it is determined that the actually received signal is abnormal.

FIG. 12 shows a data structure of reference data which is used by the individual signal determination unit 230 to determine the normality and abnormality for each signal. In the reference data, the ID, an allowable value, and a rate of change are associated with each other. The "ID" is an ID assigned to the signal. The allowable value is a value which is allowed to be set as the payload value of the signal. The "rate of change" is a rate of temporal change of the payload value which is allowed.

For example, ID 0x101 is assumed to be an ID set for a signal for transmitting a control value of a lighting state of light. It is assumed that "0" indicates a state in which the light is turned off, and "1" indicates a state in which the light is turned on. The allowable value "0,1" indicates that "0" or "1" can be set as the payload value. When a signal, in which 0x101 is set for the ID and "2" is set for the payload value, is detected, the payload value is out of a range of the allowable value set for the reference data, and thus the individual signal determination unit 230 determines that the detected signal is abnormal.

In FIG. 12, ID 0x102 is assumed to be an ID set for the signal including a measured value of the vehicle speed as the payload value. The allowable value of "1-180 km/h" indicates that a range of 0 km/h or more and 180 km/h or less can be set for the payload value. The rate of change of 80 km/h is allowed as the rate of change from the payload value of a most recently transmitted vehicle speed signal. When a signal that the vehicle speed signal changes from 30 km/h to 120 km/h is detected, the rate of change of the payload value exceeds the rate of change of 80 km/h set for the reference data, and thus the individual signal determination unit 230 determines that the detected signal is abnormal.

FIG. 13 is a diagram for describing a method for the individual signal determination unit 230 to determine the normality and abnormality of the signal by using an alive counter. In FIG. 13, "at a time of being normal", a value of the alive counter which changes in a normal manner is shown. When the alive counter is incremented each time the transmission is performed, the individual signal determination unit 230 determines that each signal is normal.

In FIG. 13, "at a time of the attack", three types of attack patterns are shown. Attack pattern 1 is an attack pattern in which the third party sets the same alive counter as the signal most recently transmitted to the communication network 280. Attack pattern 2 is an attack pattern in which the third party sets a fixed alive counter. Attack pattern 3 is an attack pattern in which the third party sets an alive counter which is estimated from the alive counter most recently transmitted to the communication network 280. The alive counter is not incremented in any of the attack patterns. However, there is also a signal group in which the alive counter is incremented, in the signal groups which are transmitted in the cycle T. Therefore, when there is the signal group in which the alive counter is incremented, in the signal groups which are transmitted in the cycle T, the individual signal determination unit 230 determines that the signal belonging to the signal group is normal. On the other hand, the individual signal determination unit 230 determines that the signal belonging to a signal group in which the alive counter is not incremented is abnormal.

In FIG. 13, "at a time of the failure", two types of failure patterns are shown. Failure pattern 1 is a pattern in which a cycle in which the alive counter makes a round is shortened. When a signal whose cycle in which the alive counter makes a round is shorter than a threshold value is detected, the individual signal determination unit 230 determines that all the signals are abnormal. In addition, the transmission source determination unit 220 determines that the state of the transmission source ECU of the signal determined to be abnormal is abnormal. Failure pattern 2 is a pattern in which a fixed value is set for the alive counter. When a signal for which the fixed value is set for the alive counter is detected, the individual signal determination unit 230 determines that all the signals are abnormal. In addition, the transmission source determination unit 220 determines that the state of the transmission source ECU of the signal determined to be abnormal is abnormal.

As described above, when determining that the abnormal signal is flowing on the communication network 280, the ECU 202 determines whether another ECU which transmits the abnormal signal is normal. When the ECU which is the transmission source of the abnormal signal is normal, it is determined that the attack on the communication network 280 has occurred, and the log information for analyzing the abnormal signal is collected, and is transmitted to the external server through the TCU 201. On the other hand, when the ECU which is the transmission source of the abnormal signal is not normal, it is determined that the ECU which transmits the abnormal signal is under failure. In this case, the ECU 202 does not collect the log information, and does not transmit the log information to the external server. Thereby, when the ECU under failure transmits the abnormal signal to the communication network 280, it is possible to reduce a possibility of erroneously determining that the attack is occurring, from the signal. Therefore, it is possible to reduce a storage resource required to store the log information. In addition, it is possible to reduce communication traffic for transmitting the log information to the outside of the vehicle 20.

It should be noted that in the embodiment described above, the ECU 202 functions as a determination device. As another embodiment, a mode in which another ECU functions can be adopted.

The vehicle 20 is a vehicle as an example of transportation equipment. The vehicle may be an automobile such as an automobile equipped with an internal combustion engine, an electric vehicle, a fuel cell vehicle (FCV), or the like. The automobile includes a bus, a truck, a motorcycle, or the like. The vehicle may be a saddle riding type vehicle, or the like, or may be a bike. The transportation equipment includes, in addition to the vehicle, equipment such as an aircraft including an unmanned aerial vehicle, and a ship. The transportation equipment may be any equipment that transports people or goods. The transportation equipment is an example of the moving object. The moving object is not limited to the transportation equipment, and may be any movable equipment.

FIG. 14 shows an example of a computer 2000 in which a plurality of embodiments of the present invention may be entirely or partially embodied. A program installed on the computer 2000 can cause the computer 2000 to function as a system such as the control system or each unit of the system according to the embodiment, or to execute an operation associated with the system or each unit of the system, and/or to execute a process or steps of the process according to the embodiment. Such a program may be executed by a CPU 2012 to cause the computer 2000 to execute the specific operation associated with some or all of the blocks of processing procedures and block diagrams described in the present specification.

The computer 2000 according to the present embodiment includes the CPU 2012, and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014, or the ROM 2026, and is executed by the CPU 2012. Information processing written in these programs is read by the computer 2000, resulting in cooperation between a program and the various types of hardware resources described above. A device or a method may be configured by implementing the operation or process of the information according to the use of the computer 2000.

For example, when a communication is executed between the computer 2000 and an external device, the CPU 2012 may execute a communication program loaded in the RAM 2014, and instruct the communication interface 2022 to process the communication based on the processing written in the communication program. Under the control of the CPU 2012, the communication interface 2022 reads transmission data stored in a transmission buffer region provided in a recording medium such as the RAM 2014 and the flash memory 2024, transmits the read transmission data to the network, or writes received data which is received from the network to a receiving buffer region or the like provided on the recording medium.

In addition, the CPU 2012 may cause all or a necessary portion of a file or a database to be read into the RAM 2014, the file or the database having been stored in the recording medium such as the flash memory 2024, etc., and perform various types of processing on the data on the RAM 2014. The CPU 2012 then writes back the processed data to the recording medium.

Various types of information, such as various types of programs, data, tables, and databases, may be stored in the recording medium to undergo information processing. The CPU 2012 may execute various types of processing on the data read from the RAM 2014 to write back a result to the RAM 2014, the processing being described in the present specification, specified by instruction sequences of the programs, and including various types of operations, information processing, condition determinations, conditional branching, unconditional branching, information retrievals/replacements, or the like. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module described above may be stored in a computer-readable storage medium on the computer 2000 or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program, which is installed on the computer 2000 and causes the computer 2000 to function as an ECU 202, may work on the CPU 2012 or the like to cause the computer 2000 to function as each unit of the ECU 202. Information processing written in these programs functions as each unit of the ECU 202 that is specific means by which software and the above-described various hardware resources cooperate by being read by the computer 2000. Then, by the specific means realizing calculation or processing of information according to a purpose of use of the computer 2000 in the present embodiment, the unique ECU 202 according to the purpose of use is constructed.

Various embodiments have been described with reference to the block diagrams or the like. Blocks in the block diagrams may respectively represent (1) steps of processes in which operations are performed or (2) "units" of apparatuses responsible for performing operations. Certain steps and "units" may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

The computer-readable storage medium may include any tangible device that can store instructions to be executed by a suitable device, and as a result, the computer-readable storage medium having the instructions stored thereon constitutes at least a part of an article of manufacture including instructions which can be executed to create means for performing operations specified in the processing procedures or block diagrams. Examples of computer-readable storage medium may include an electronic storage medium, a magnetic storage medium, an optical storage medium, an electromagnetic storage medium, a semiconductor storage medium, etc. Specific examples of the computer-readable storage medium may include a floppy (Registered Trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (Registered Trademark) disc, a memory stick, an integrated circuit card, or the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk(registered trademark), JAVA(registered trademark), C++, etc., and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc., so that the computer-readable instructions are executed to create means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 control system
20 vehicle
201 TCU
202, 203, 204, 205, 206 ECU
210 signal determination unit
220 transmission source determination unit
230 individual signal determination unit
240 attack determination unit
260 processing unit
270 storage unit
280 communication network
1010 pattern
2000 computer
2010 host controller
2012 CPU
2014 RAM
2020 input/output controller
2022 communication interface
2024 flash memory
2026 ROM
2040 input/output chip

What is claimed is:

1. A determination device comprising at least one processor, wherein:
the at least one processor determines whether a signal flowing on a communication network in a moving object is abnormal;
the at least one processor determines when the at least one processor determines that the signal flowing on the communication network is abnormal, whether a communication device which is a transmission source of the abnormal signal is normal; and
the at least one processor determines that an attack on the communication network has occurred, when the at least one processor determines that the signal flowing on the communication network is abnormal, and the at least one processor determines that the communication device which is the transmission source of the abnormal signal is normal, wherein
the at least one processor determines whether the signal flowing on the communication network is abnormal for each type of signal, and
the at least one processor performs in a case where the at least one processor determines that a first type of signal flowing on the communication network is abnormal, when the at least one processor determines that a second type of signal, which has a different type from the first type of signal and is transmitted to the communication network from a communication device that is a transmission source of the first type of signal, is not abnormal, a determination that the communication device which is the transmission source is normal.

2. The determination device according to claim 1, wherein when the at least one processor determines that the attack has occurred on the communication network, information relating to the abnormal signal is transmitted to an external device.

3. The determination device according to claim 2, wherein:
the at least one processor determines whether each of signals flowing on the communication network is abnormal for each signal;
the at least one processor performs in a case where the at least one processor determines that the signal flowing on the communication network is abnormal, when a signal determined by the at least one processor not to be abnormal is included in a second signal transmitted, after a first signal, to the communication network from a communication device which is a transmission source of the first signal determined by the at least one processor to be abnormal, a determination that the communication device which is the transmission source is normal; and
the at least one processor performs in a case where the at least one processor determines that the signal flowing on the communication network is abnormal, when a signal determined by the at least one processor not to be abnormal is not included in the second signal transmitted, after the first signal, to the communication network from the communication device which is the transmission source of the first signal determined by the at least one processor to be abnormal, a determination that the communication device which is the transmission source is abnormal.

4. The determination device according to claim 3, wherein the at least one processor learns a transmission pattern of the signal flowing on the communication network for each type of signal flowing on the communication network, and performs when a signal which is transmitted to the communication network in a transmission pattern different from the learned transmission pattern is detected, a determination that the detected signal is abnormal.

5. The determination device according to claim 3, wherein the at least one processor extracts a payload value of the signal flowing on the communication network, and determines that a signal from which a payload value different from a predetermined value is extracted is abnormal.

6. The determination device according to claim 1, wherein the moving object is a vehicle.

7. The determination device according to claim 6, wherein the communication device is an ECU and the communication network is a CAN.

8. The determination device according to claim 1, wherein:
the at least one processor determines whether each of signals flowing on the communication network is abnormal for each signal; wherein the at least one processor performs in a case where the at least one processor determines that the signal flowing on the communication network is abnormal, when a signal determined by the at least one processor not to be abnormal is included in a second signal transmitted, after a first signal, to the communication network from a communication device which is a transmission source of the first signal determined by the at least one processor to be abnormal, a determination that the communication device which is the transmission source is normal; and the at least one processor performs in a case where the at least one processor determines that the signal flowing on the communication network is abnormal, when a signal determined by the at least one processor not to be abnormal is not included in the second signal transmitted, after the first signal, to the communication network from the communication device which is the transmission source of the first signal determined by the at least one processor to be abnormal, a determination that the communication device which is the transmission source is abnormal.

9. A determination device comprising at least one processor, wherein:

the at least one processor determines whether a signal flowing on a communication network in a moving object is abnormal;

the at least one processor determines when the at least one processor determines that the signal flowing on the communication network is abnormal, whether a communication device which is a transmission source of the abnormal signal is normal; and the at least one processor determines that an attack on the communication network has occurred, when the at least one processor determines that the signal flowing on the communication network is abnormal, and the at least one processor determines that the communication device which is the transmission source of the abnormal signal is normal; and the at least one processor determines whether each of signals flowing on the communication network is abnormal for each signal, wherein the at least one processor performs in a case where the at least one processor determines that the signal flowing on the communication network is abnormal, when a signal determined by the at least one processor not to be abnormal is included in a second signal transmitted, after a first signal, to the communication network from a communication device which is a transmission source of the first signal determined by the at least one processor to be abnormal, a determination that the communication device which is the transmission source is normal, and the at least one processor performs in a case where the at least one processor determines that the signal flowing on the communication network is abnormal, when a signal determined by the at least one processor not to be abnormal is not included in the second signal transmitted, after the first signal, to the communication network from the communication device which is the transmission source of the first signal determined by the at least one processor to be abnormal, a determination that the communication device which is the transmission source is abnormal.

10. The determination device according to claim 9, wherein the at least one processor learns a transmission pattern of the signal flowing on the communication network for each type of signal flowing on the communication network, and performs when a signal which is transmitted to the communication network in a transmission pattern different from the learned transmission pattern is detected, a determination that the detected signal is abnormal.

11. The determination device according to claim 9, wherein the at least one processor extracts a payload value of the signal flowing on the communication network, and determines that a signal from which a payload value different from a predetermined value is extracted is abnormal.

12. The determination device according to claim 9, wherein the at least one processor a payload value of the signal flowing on the communication network, and determines that a signal whose amount of a temporal change in the extracted payload value does not satisfy a predetermined condition is abnormal.

13. The determination device according to claim 9, wherein the moving object is a vehicle, the communication device is an ECU (Electronic Control Unit), and the communication network is a CAN (Controller Area Network), and the at least one processor determines whether each of the signals flowing on the communication network is abnormal for each signal, based on a change in a value of an alive counter of a frame which is transmitted from the ECU connected to the CAN, and determines whether a communication device which transmits the signal determined to be abnormal is normal.

14. A moving object comprising a determination device including at least one processor, wherein:

the at least one processor determines whether a signal flowing on a communication network in a moving object is abnormal;

the at least one processor determines when the at least one processor determines that the signal flowing on the communication network is abnormal, whether a communication device which is a transmission source of the abnormal signal is normal;

the at least one processor determines that an attack on the communication network has occurred, when the at least one processor determines that the signal flowing on the communication network is abnormal, and the at least one processor determines that the communication device which is the transmission source of the abnormal signal is normal;

the at least one processor determines whether the signal flowing on the communication network is abnormal for each type of signal; and the at least one processor performs in a case where the at least one processor determines that a first type of signal flowing on the communication network is abnormal, when the at least one processor determines that a second type of signal, which has a different type from the first type of signal and is transmitted to the communication network from a communication device that is a transmission source of the first type of signal, is not abnormal, a determination that the communication device which is the transmission source is normal.

15. A determination method comprising:

determining whether a signal flowing on a communication network in a moving object is abnormal;

determining, when the signal flowing on the communication network is determined to be abnormal in the determining of the signal, whether a communication device which is a transmission source of the abnormal signal is normal;

determining that an attack on the communication network has occurred, when the signal flowing on the communication network is determined to be abnormal in the determining of the signal, and the communication device which is the transmission source of the abnormal signal is determined to be normal in the determining of the transmission source;

determining whether the signal flowing on the communication network is abnormal for each type of signal; and performing, in a case where a first type of signal flowing on the communication network is determined to be abnormal, when a second type of signal, which has a different type from the first type of signal and is transmitted to the communication network from a communication device that is a transmission source of the first type of signal, is determined to be not abnormal, a determination that the communication device which is the transmission source is normal.

16. A non-transitory computer-readable storage medium having stored thereon a program that, when executed by a computer, causes the computer to:

determine whether a signal flowing on a communication network in a moving object is abnormal;

determine, when the signal flowing on the communication network is determined to be abnormal, whether a communication device which is a transmission source of the abnormal signal is normal;

determine that an attack on the communication network has occurred, when the signal flowing on the communication network is determined to be abnormal, and the communication device which is the transmission source of the abnormal signal is determined to be normal;

determine whether the signal flowing on the communication network is abnormal for each type of signal; and perform, in a case where a first type of signal flowing on the communication network is determined to be abnormal, when a second type of signal, which has a different type from the first type of signal and is transmitted to the communication network from a communication device that is a transmission source of the first type of signal, is determined to be not abnormal, a determination that the communication device which is the transmission source is normal.

* * * * *